(12) United States Patent  
Bedrosian

(10) Patent No.: US 8,774,197 B2
(45) Date of Patent: *Jul. 8, 2014

(54) LINE-TIMING IN PACKET-BASED NETWORKS

(75) Inventor: P. Stephan Bedrosian, Andover, MA (US)

(73) Assignee: Agere Systems LLC, Allentown, PA (US)

( * ) Notice: Subject to any disclaimer, the term of this patent is extended or adjusted under 35 U.S.C. 154(b) by 156 days.

This patent is subject to a terminal disclaimer.

(21) Appl. No.: 13/462,927

(22) Filed: May 3, 2012

(65) Prior Publication Data

US 2012/0218986 A1 Aug. 30, 2012

Related U.S. Application Data

(63) Continuation of application No. 12/369,878, filed on Feb. 12, 2009, now Pat. No. 8,213,436, which is a continuation of application No. 11/115,715, filed on Apr. 27, 2005, now Pat. No. 7,539,200.

(51) Int. Cl.
*H04L 12/56* (2006.01)
(52) U.S. Cl.
USPC ..................................... 370/395.62; 370/518
(58) Field of Classification Search
USPC .................... 370/389, 395.62, 324, 350, 503
See application file for complete search history.

(56) References Cited

U.S. PATENT DOCUMENTS

| | | | |
|---|---|---|---|
| 5,060,241 A | 10/1991 | Allouis et al. | |
| 5,982,831 A | 11/1999 | Chu | |
| 6,810,270 B1 | 10/2004 | Grohn et al. | |
| 7,391,975 B2 | 6/2008 | Oettinger et al. | |
| 7,539,200 B2 * | 5/2009 | Bedrosian | 370/395.62 |
| 8,213,436 B2 * | 7/2012 | Bedrosian | 370/395.62 |
| 2003/0012158 A1 | 1/2003 | Jin et al. | |
| 2003/0076851 A1 | 4/2003 | Mahajan et al. | |

FOREIGN PATENT DOCUMENTS

| | | |
|---|---|---|
| CN | 1578197 | 2/2005 |
| EP | 0991216 A2 | 4/2000 |
| EP | 1427121 A1 | 6/2004 |
| JP | 60066539 | 4/1985 |
| JP | 08-256136 A | 1/1996 |

(Continued)

OTHER PUBLICATIONS

Non Final Office Action; Mailed Mar. 26, 2008 for corresponding U.S. Appl. No. 11/115,715.

(Continued)

*Primary Examiner* — Brenda H Pham
(74) *Attorney, Agent, or Firm* — Mendelsohn, Drucker & Dunleavy, P.C.; Steve Mendelsohn

(57) ABSTRACT

In a packet-based (e.g., Ethernet) network, such as the network of central offices and base stations of a wireless telephone system, a node receives one or more incoming packet-based signals from one or more other nodes of the network and recovers a clock signal from each incoming packet-based signal. The node selects one of the recovered clock signals as the node's reference clock signal. When the node is part of a base station, the node uses the selected clock to generate and transmit one or more outgoing packet-based signals to one or more central offices. The node also uses the selected clock to generate the base station's wireless transmissions. In one implementation, the base stations and central offices are connected by Ethernet facilities.

26 Claims, 4 Drawing Sheets

(56) References Cited

FOREIGN PATENT DOCUMENTS

| | | | |
|---|---|---|---|
| JP | 8265286 | A | 10/1996 |
| JP | 09-247134 | A | 9/1997 |
| JP | 11055234 | | 2/1999 |
| JP | 2000068966 | A | 3/2000 |
| JP | 2000350245 | A | 12/2000 |
| JP | 2006217359 | A | 8/2006 |
| SU | 1270764 | A1 | 11/1986 |

OTHER PUBLICATIONS

Final Rejection; Mailed Sep. 5, 2008 for corresponding U.S. Appl. No. 11/115,715.
Notice of Allowance; Mailed Jan. 28, 2009 for corresponding U.S. Appl. No. 11/115,715.
Non Final Office Action; Mailed Oct. 20, 2011 for corresponding U.S. Appl. No. 12/369,878.
Final Rejection; Mailed Feb. 6, 2012 for corresponding U.S. Appl. No. 12/369,878.
Notice of Allowance; Mailed Mar. 5, 2012 for corresponding U.S. Appl. No. 12/369,878.
Examination Report: Mailed Aug. 12, 2010 for corresponding GB Application No. 0607970.1.
IEEE Standard 1588-2002; IEEE Standard for a Precision Clock Synchronization Protocol for Networked Measurement and Control Systems; IEEE, Nov. 8, 2002; pp. 10-25, 64-76.
Search and Examination Report; Mailed May 16, 2011 for corresponding GB Application No. 1106984.6.
Search and Examination Report; Mailed May 16, 2011 for corresponding GB Application No. 1106986.1.
Refusal Decision; Mailed Jul. 13, 2011 for corresponding JP Application No. 2006-122764.
Notice of Reason for Refusal; Mailed Sep. 3, 2013 for corresponding JP Application No. 2012-105019.
Notice of Preliminary Rejection; Mailed: Jul. 20, 2012 for corresponding KR Application No. 10-2006-0038091.

* cited by examiner

LINE-TIMING IN PACKET-BASED NETWORKS

CROSS-REFERENCE TO RELATED APPLICATIONS

This is a continuation of co-pending application Ser. No. 12/369,878, filed on Feb. 12, 2009, which was itself a continuation of then co-pending application Ser. No. 11/115,715, filed on Apr. 27, 2005, the teachings of both of which are incorporated herein by reference in its entirety.

BACKGROUND OF THE INVENTION

1. Field of the Invention

The present invention relates to packet-based networks, such as a wireless telephone system having packet-based connections (e.g., Ethernet facilities) between its base stations and central offices.

2. Description of the Related Art

Traditionally, base stations of wireless telephone systems are connected to central offices via terrestrial (electrical or optical) links that transmit DS1 or E1 synchronous, time-division multiplexed (TDM) signals or synchronous optical network (SONET) signals. DS1 signals can provide data rates up to about 1.544 Mbps, while E1 signals can provide data rates up to about 2.048 Mbps.

A base station transmits, to one or more wireless units (e.g., mobile cell phones) located within the base station's cell site, wireless signals at specific frequencies, whose accuracies are typically required to be within 50 parts per billion (PPB) (for Third Generation Partnership Project (3GPP) standards) or 16 PPB (for Open Base Station Architecture Initiative (OBSAI) standards). In order to achieve these high accuracies, base stations can be implemented with global positioning system (GPS) receivers that are capable to recovering clock signals with accuracies better than 16 PPB. Unfortunately, it can be prohibitively expensive to provision each base station in a wireless telephone system with such a GPS receiver.

Another possible solution would be to provide each base station with its own free-running oscillator capable of generating a clock signal of sufficient accuracy, but this too can be prohibitively expensive.

Yet another known technique for providing a sufficiently accurate clock signal is for the base station to use line timing to derive its reference clock signal from the received synchronous signals. In conventional line timing at a base station, different clock signals are recovered from two or more different incoming synchronous (e.g., DS1/E1) signals received from one or more central offices, and one of the recovered clock signals is selected for use in (1) generating one or more outgoing synchronous (e.g., DS1/E1) signals for transmission back to the one or more central offices and (2) generating the base station's wireless signals for transmission to the base station's associated wireless units.

In order to provide higher data rates (e.g., 100 Mbps or higher) between base stations and central offices, wireless telephone systems are being proposed to employ packet-based Ethernet connections (i.e., facilities) between base stations and central offices, instead of the conventional DS1/E1 connections. As used herein, the term "Ethernet" refers to technology conforming to local area network (LAN) standard IEEE 802.3 (1980) and/or to any of its extensions. Conventional Ethernet facilities between two nodes rely on either (1) each node having its own local oscillator for use in generating the reference clock signal used to control its Ethernet transmissions to the other node or (2) loop timing, wherein one node's physical interface (PHY) derives its reference clock signal (which that node uses to control its Ethernet transmissions to the other node) from the Ethernet transmissions received from the other node, which other node has a local oscillator for use in generating its reference clock signal. Existing Ethernet standards dictate clock signal accuracies to within only about 100 parts per million (PPM). As such, reference clocks for traditional Ethernet technology are not sufficiently accurate to use as references for generating the wireless signals transmitted by the base stations of a conventional wireless telephone system.

SUMMARY OF THE INVENTION

Problems in the prior art are addressed in accordance with the principles of the present invention by implementing line timing in a packet-based communications system, such as a wireless telephone system whose base stations and central offices communicate over Ethernet facilities, where the Ethernet signals for at least one connection from a central office to a base station is generated using a sufficiently accurate clock such that the base station can recover from the received Ethernet signals a reference clock accurate enough to use to generate the base station's wireless transmissions. Such a system can achieve the increased data rates between base stations and central offices provided by Ethernet facilities (as opposed to the slower, prior-art DS1/E1 connections), while ensuring sufficiently accurate reference clocks for the system's wireless communications without having to deploy either GPS receivers or accurate free-running oscillators at the base stations.

In one embodiment, the present invention is a node for a packet-based network. The node comprises one or more receivers, a clock selector, a timing engine, and one or more transmitters. Each receiver is configured to receive an incoming packet-based signal from an other node of the network and apply line timing to recover a line-timed clock signal from the incoming packet-based signal, wherein the incoming packet-based signal is received over an incoming facility having timed transitions even when no packet data is being transmitted over the incoming facility. The clock selector is configured to select one of the one or more recovered line-timed clock signals as a selected reference clock signal. The timing engine is configured to filter out phase noise from the selected reference clock signal to generate a node clock signal. Each transmitter is configured to generate and transmit an outgoing packet-based signal to an other node of the network based on the node clock signal.

In another embodiment, the present invention is a node for a packet-based network. The node comprises a clock source and one or more transmitters. The clock source, having an accuracy of 16 PPB or better, is configured to generate a reference clock signal for the node. Each transmitter is configured to generate and transmit an outgoing packet-based signal to an other node of the network based on the reference clock signal. The outgoing packet-based signal is transmitted over an outgoing facility having timed transitions even when no packet data is being transmitted over the outgoing facility. The outgoing packet-based signal comprises a sequence of heart-beat synchronization status packets (SSPs) identifying (i) an accuracy level of the reference clock signal and (ii) a source address of the node, wherein each transmitter is configured to transmit heart-beat SSPs at a specified rate.

In yet another embodiment, the present invention is a node for a packet-based network. The node comprises at least one receiver, a clock selector, a timing engine, and one or more transmitters. The at least one receiver is configured to receive an incoming packet-based signal from a first node of the network. The clock selector is configured to (i) receive one or more derived clock signals from one or more other nodes of the network different from the first node and (ii) select one of the one or more derived clock signals as a selected reference clock signal. The timing engine is configured to filter out phase noise from the selected reference clock signal to generate a node clock signal. Each transmitter configured to generate and transmit an outgoing packet-based signal to an other node of the network based on the node clock signal.

In yet another embodiment, the present invention is a regeneration node for a packet-based network. The regeneration node comprises a receiver, a timing engine, and a transmitter. The receiver is configured to receive an incoming packet-based signal from an other node of the network and apply line timing to recover a line-timed clock signal from the incoming packet-based signal, wherein the incoming packet-based signal is received over an incoming facility having an input timing domain with timed transitions even when no packet data is being transmitted over the incoming facility. The timing engine is configured to filter out phase noise from the recovered line-timed clock signal to generate a node clock signal. The transmitter is configured to generate and transmit an outgoing packet-based signal to an other node of the network based on the node clock signal, wherein the outgoing packet-based signal preserves the input timing domain of the incoming facility.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 1:
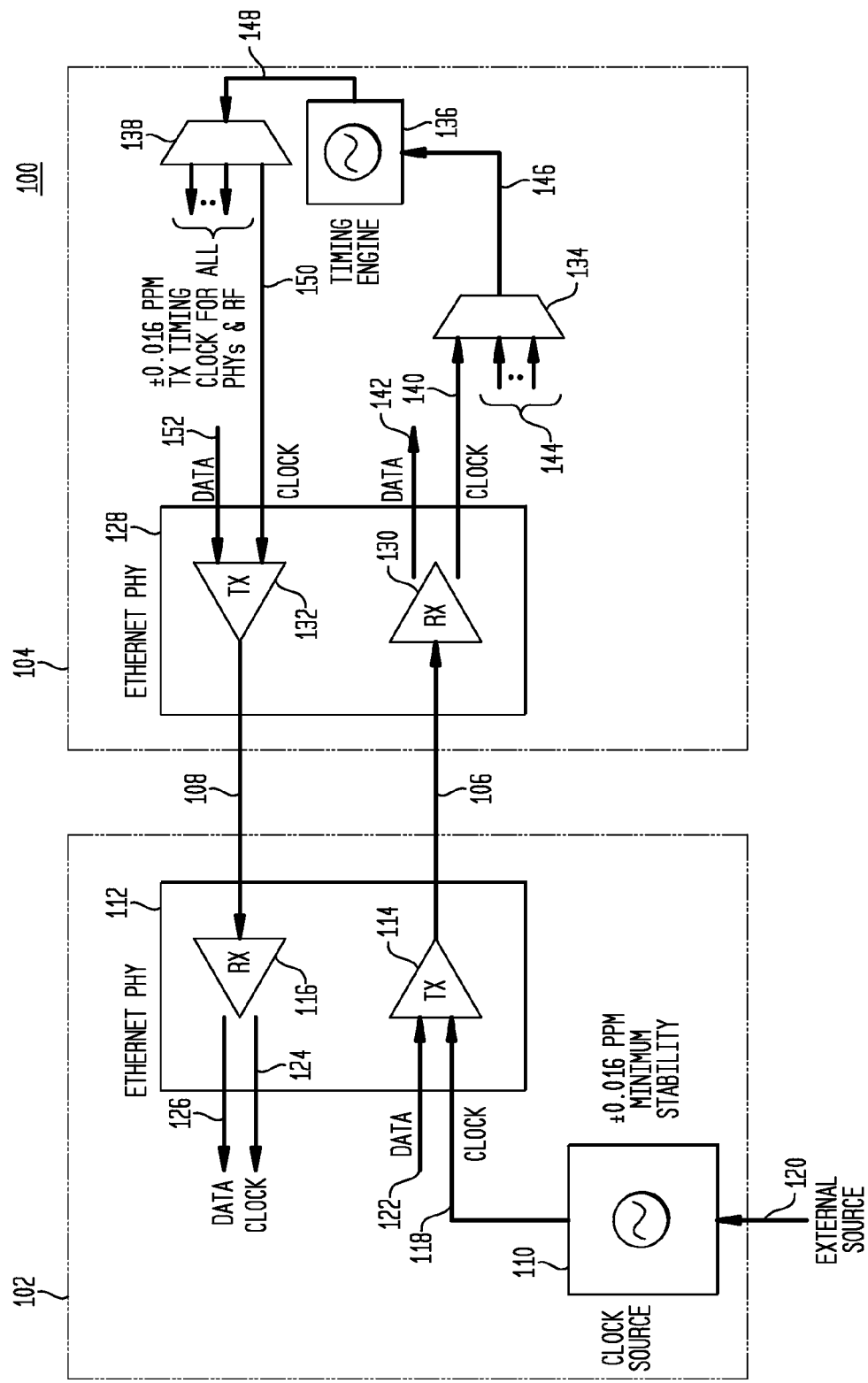
FIG. 1 is a block diagram of a portion of an exemplary wireless telephone system of the present invention.

FIG. 1 is a block diagram of a portion of an exemplary wireless telephone system 100 of the present invention. In particular, FIG. 1 shows network element 102 (e.g., a master timing node located at a central office of system 100) and node 104 (e.g., a slave node located at a base station of system 100) interconnected by packet-based Ethernet facilities 106 and 108 (e.g., 1000 BASE-LX10 or 100 BASE-LX10). For at least the combination of network element 102 and node 104, network element 102 functions as a master timing reference, and node 104 is a timing slave that implements line timing to derive the reference clock that the node uses to drive its operations, including the generation of the base station's wireless transmissions to its associated wireless units.

As shown in FIG. 1, network element 102 includes clock source timing engine 110 and Ethernet physical (PHY) interface 112 (having Ethernet transmitter 114 and Ethernet receiver 116). Clock source timing engine 110 generates clock signal 118 having an accuracy of about 50 PPB or better. In the implementation shown in FIG. 1, clock signal 118 is a Stratum 2 (or better) clock signal having an accuracy of about 16 PPB or better. Depending on the implementation, clock source timing engine 110 may be able to achieve these accuracy levels while operating in a stand-alone mode or may require the receipt of a sufficiently accurate reference clock signal 120 from an external clock source (e.g., a GPS receiver) (not shown) in order to generate clock signal 118. In any case, clock signal 118 is provided to Ethernet transmitter 114, which uses that clock signal to convert data stream 122 into packet-based Ethernet signals for transmission over Ethernet facility 106 to node 104.

In addition, Ethernet receiver 116 receives packet-based Ethernet signals transmitted from node 104 over Ethernet facility 108 and performs clock-and-data recovery (CDR) operations to recover clock signal 124 and data signal 126, which is further processed according to known wireless communication system operations, such as transmitting payload data to a circuit-switched telephone system for routing to other end users, using other circuitry not shown in FIG. 1. For 100Base and 1000Base type Ethernet signals, there are always timed transitions on the facilities, even when there is no data to transmit. This keeps the CDRs synchronized and makes sync recovery easier.

As also shown in FIG. 1, node 104 includes Ethernet PHY interface 128 (having Ethernet receiver 130 and Ethernet transmitter 132), clock selector 134, timing engine 136, and clock distributor 138. Ethernet receiver 130 receives packet-based Ethernet signals transmitted from network element 102 over Ethernet facility 106 and performs CDR operations to recover clock signal 140 and data signal 142, which is further processed according to known communication system procedures, such as formatting payload data for wireless transmissions to the base station's mobile units using other circuitry not shown in FIG. 1.

Clock selector 134 receives clock signal 140 from Ethernet PHY interface 128 as well as possibly one or more other clock signals 144 from other Ethernet PHY interfaces implemented within node 104, which other Ethernet PHY interfaces recover clock signals 144 from other packet-based Ethernet signals received from other network elements, similar to network element 102, located at the same central office and/or at other central offices of wireless telephone system 100. Clock selector 134 implements a clock-selection algorithm (to be described later) to select one of the recovered clock signals (140, 144) as reference clock signal 146 for node 104.

Reference clock signal 146 is provided to timing engine 136, which, depending on its current operating mode, may use reference clock signal 146 to generate node clock signal 148, which is used to drive certain operations within node 104. Timing engine 136 has circuitry designed to ensure that the output timing stability of node clock signal 148 will be no worse than 50 PPB. Depending on the implementation, timing engine 136 may employ rubidium or ovenized techniques to create a stable frequency reference that may be used to ensure a suitable holdover or free-run mode capable of sustaining the minimum clock accuracy should the timing on the incoming Ethernet facilities become unsuitable.

Clock distributor 138 distributes node clock signal 148 to those certain operations, which includes (1) the generation of one or more packet-based Ethernet signals for transmission to network element 102 and possibly one or more other network elements in the same or other central offices of system 100 and (2) the generation of wireless signals for transmission to the base station's wireless units.

In particular, FIG. 1 shows distributed clock signal 150 being provided by clock distributor 138 to Ethernet transmitter 132, which uses that clock signal to convert data stream 152 into packet-based Ethernet signals for transmission over Ethernet facility 108 to network element 102. Note that, depending on the selection made by clock selector 134, clock signal 150 used by Ethernet transmitter 132 of PHY interface 128 might or might not be based on clock signal 140 recovered by Ethernet receiver 130 of that same PHY interface.

Under normal operating conditions, at least one of the recovered clock signals (140, 144) provided to clock selector 134 has an accuracy sufficient to satisfy the frequency requirements associated with the base station's wireless transmissions, such that, as a result of suitable processing by clock selector 134 and timing engine 136, node clock signal 148 is sufficiently accurate for use in generating those wireless transmissions.

Note that the timing transport over Ethernet facility 106 should be "through-timed" (per ANSI Standard T1.101-1999). For example, routers typically retime incoming Ethernet packets using an internal free-running reference clock. If any "regeneration" needs to be performed, e.g., due to optical attenuation, then that regeneration should employ a "through timing" scheme to preserve the incoming timing while boosting the attenuated bit-stream.

If a timed Ethernet facility needs to traverse a router or some other data processing node, then the timing of this outgoing facility should be "through-timed" to the designated incoming facility. In this way, the timing flow from the input timing facility will flow "through" the router and emerge on the outgoing facility.

Clock selector 134 should be designed to implement an algorithm that efficiently selects an appropriate recovered clock signal for use as reference clock signal 146. Moreover, the algorithm implemented by clock selector 134 should also be designed to react appropriately to changing conditions in individual recovered clock signals over time, such as when a particular clock signal is no longer sufficiently accurate as a result of a failure or other anomalous event in the network element that generated the Ethernet signal from which that clock signal was recovered.

In one possible implementation, clock selector 134 analyzes recovered clock signals 140, 144 to determine which one or more of those recovered clock signals is sufficiently accurate. In one possible scheme, clock selector 134 compares one or more different pairs of recovered clock signals (e.g., to see if they both have substantially the same number of clock cycles within the same period of time) and then processes the results of those comparisons to identify those recovered clock signals that are sufficiently accurate for use in generating the base station's wireless transmissions.

A pair of clock signals can be used to cross-check the accuracy of their timing. The measurement of one signal against the other can be done by using one as an input signal (A) and the other (B) as a reference input for deriving a measurement interval. The number of clock cycles of the input signal (A) can be counted for a given interval as established by the reference input (B). In order to ensure high accuracy (e.g., on the order of parts per billion), a sufficient measurement interval is used to count, e.g., at least 1 billion clock cycles (A) to determine the timing error. The timing error will yield a frequency offset between the two timing signals (A) and (B). Since the magnitude of the frequency offset of (A) measured against (B) is the same as that for (B) measured against (A), only one of these measurement methods needs to be done. In order for the timing accuracy between the two references to be considered valid, the number of measured clock cycles (A) cannot exceed either an upper-bound or lower-bound threshold. Since both references originate from different clocks, this method of comparison should prove to be statistically significant.

As an example, assume that clock selector 134 receives four different recovered clock signals A, B, C, and D from four different Ethernet receivers processing four different incoming Ethernet signals. Assume further that recovered clock signal C is bad (i.e., has an accuracy worse than 50 PPB), while recovered clock signals A, B, and D are good (i.e., have accuracies equal to or better than 50 PPB). In this example, there are six different possible signal-pair comparisons A-to-B, A-to-C, A-to-D, B-to-C, B-to-D, and C-to-D.

At each signal-pair comparison (see steps 202 and 212 of FIG. 2), clock selector 134 counts the number of cycles of one of the clock signals over an interval established based on a specified number of cycles of the other clock signal (step 204). The number of clock cycles counted for the first clock signal is then compared to specified upper and lower thresholds (step 206). If the count is between the thresholds, then the current pair of clock signals is said to have a relatively small frequency offset (indicating that both clock signals are sufficiently accurate for use as the slave node's reference clock) (step 208). Otherwise, the count is not between the thresholds and the current pair of clock signals is said to have a relatively large frequency offset (indicating that at least one of the clock signals is not sufficiently accurate for use as the slave node's reference clock) (step 210).

Clock selector 134 analyzes the results from one or more different signal-pair comparisons to identify the accurate recovered clock signals (step 214). Continuing with the previous example, the results of the six different possible signal-pair comparisons are shown in Table I. Based on these results, clock selector 134 would conclude that recovered clock signals A, B, and D are good and that recovered clock signal C is bad. Clock selector 134 could then select any of clock signals A, B, and D for use as reference clock signal 146 (step 214). For instance, clock selector 134 could be programmed with an (arbitrary) priority scheme, such as (i) A is selected over B, C, or D, (ii) B is selected over C or D, and (iii) C is selected over D. In that case, for the current example, clock selector 134 would select recovered clock signal A for use as reference clock signal 146.

TABLE I

SIGNAL-PAIR COMPARISON RESULTS

| Signal Pair | Results | Conclusion |
| --- | --- | --- |
| A-to-B | Frequency offset small | Both A and B are good |
| A-to-C | Frequency offset large | A or C or both are bad |
| A-to-D | Frequency offset small | Both A and D are good |
| B-to-C | Frequency offset large | B or C or both are bad |
| B-to-D | Frequency offset small | Both B and D are good |
| C-to-D | Frequency offset large | C or D or both are bad |

If, for some reason (e.g., the oscillator used to generate the Ethernet signal from which clock signal A is recovered), clock signal A changes from good to bad, then clock selector 134 would (1) determine that the frequency offsets for signal-pair comparisons A-to-B and A-to-D are now relatively large, (2) determine that clock signals B and D are the only good clock signals, and (3) select clock signal B for reference clock signal 146 (since clock signal B has a higher priority than clock signal D).

Similarly, if clock signal A again becomes good, clock selector 134 would detect that change and, depending on its programming, either revert back to selecting clock signal A for reference clock signal 146 or stay with clock signal B (to minimize any unnecessary disturbances resulting from switching from one good clock signal to another).

Note that variations of this clock-comparison scheme are possible. For example, if the comparison of A-to-B indicates that the frequency offset is relatively small, then clock selector 134 would conclude that both clock signals A and B are good. In that case, no other signal-pair comparisons need to be performed. In general, additional signal-pair comparisons need to be performed only until the ambiguities of the previous signal-pair comparison results are resolved.

Note that, if the comparison of A-to-B indicates that at least one of clock signals A and B is bad and if the comparison of A-to-C indicates that at least one of clock signals A and C is bad, then there are five different possible situations: (1) A is bad, but B and C are good, (2) A and B are bad, but C is good, (3) A and C are bad, but B is good, (4) B and C are bad, but A is good, and (5) A, B, and C are all bad. If the system has a single-point failure assumption, then Scenario #1 (the only scenario with only one failure) can be assumed to be true and clock selector 134 can select either clock signal B or C as reference clock signal 146. Otherwise, additional signal-pair comparisons (e.g., B-to-C) will need to be performed to resolve which of the different possible scenarios is true. With a single-point failure assumption, at least three recovered clock signals are needed in order to perform this clock-selection algorithm.

Figure 2:
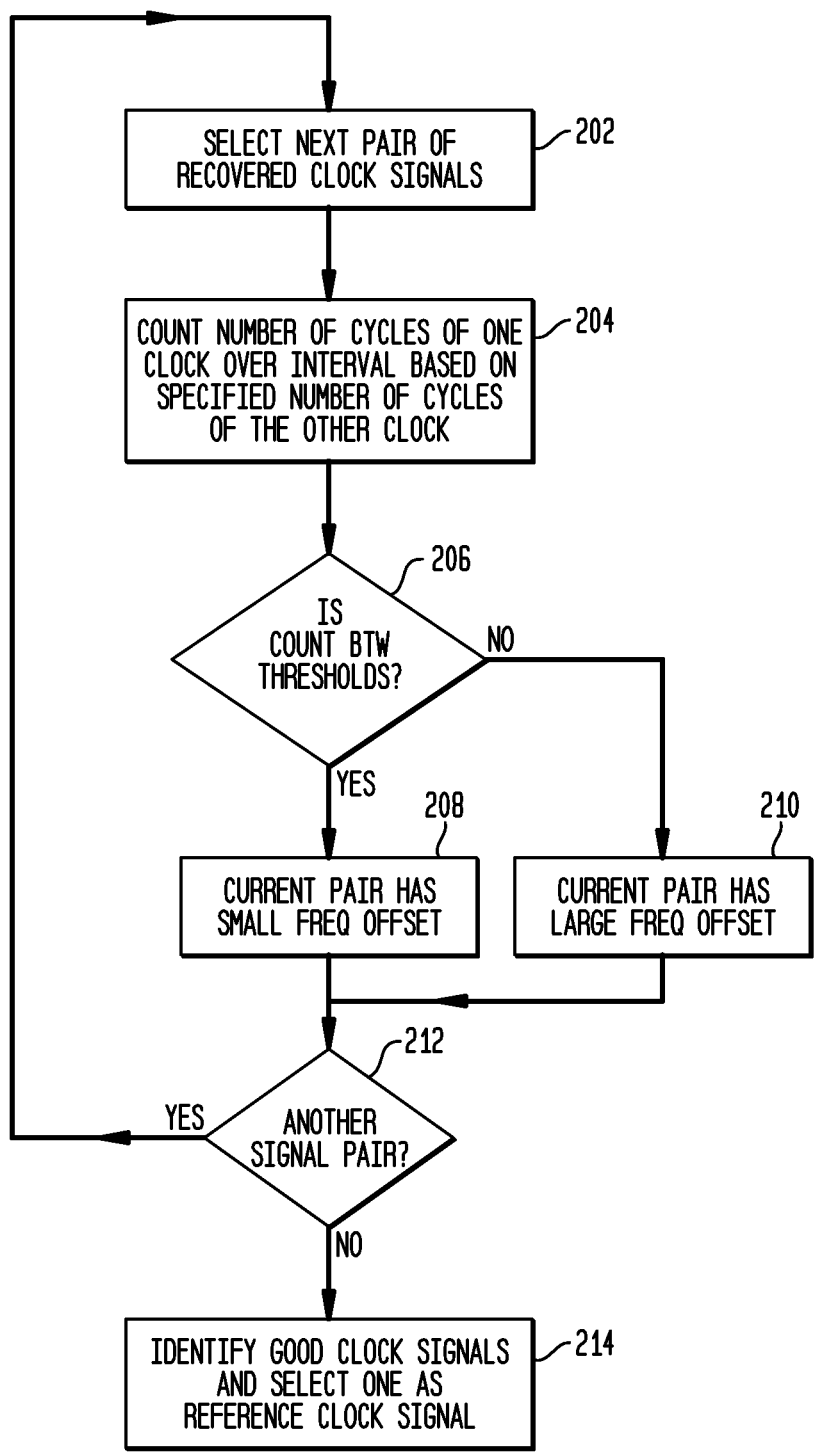
FIG. 2 is a flow diagram of the processing implemented by the clock selector of FIG. 1 to select a reference clock signal using signal-pair comparisons.

As shown in FIG. 2, if the frequency offset for the current signal-pair comparison is relatively small (step 208), then clock selector 134 will always be able to identify at least two recovered clock signals (i.e., at least the current pair of recovered clock signals) as being accurate enough to use for reference clock signal 146. In that case, processing can proceed to step 214, where clock selector 134 identifies the good clock signals and selects one of them for the reference clock signal. Otherwise, processing returns to step 202 to select the next pair of recovered clock signals for comparison processing.

Another option would be to compare the recovered clock signals with the output of a local free-running reference oscillator in holdover mode at the Ethernet receiver. The holdover mode oscillator will "remember the last good input" and can be used as a stable short-term reference for use in qualifying or re-qualifying a restored reference.

Figure 3:
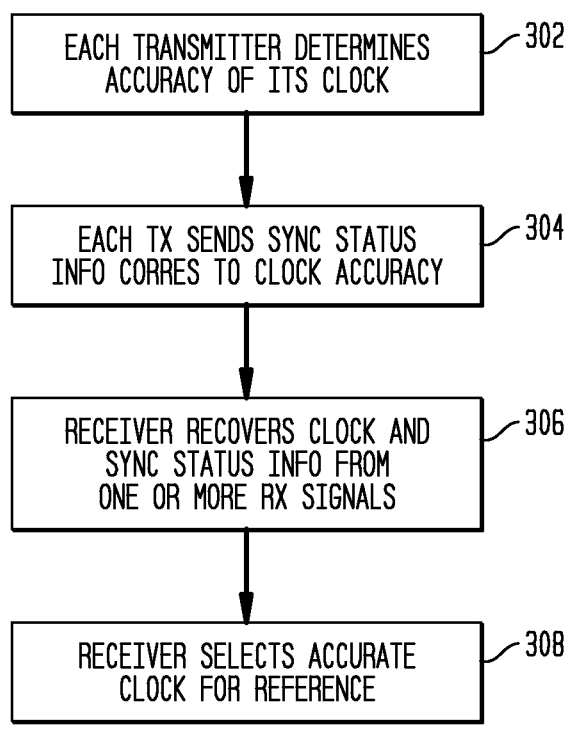
FIG. 3 is a flow diagram of the processing implemented by the clock selector of FIG. 1 to select a reference clock signal using a sync status signaling scheme.

Depending on the particular implementation, in addition to or instead of the clock-selection algorithm of FIG. 2, system 100 implements the synchronization status signaling scheme of FIG. 3, in which each network element (such as network element 102 of FIG. 1) determines the accuracy of the reference clock that it uses to generate its Ethernet transmissions (step 302 of FIG. 3) and includes sync status information in the Ethernet signals that it transmits to its corresponding base station node (such as node 104 of FIG. 1), where the sync status information identifies the reference clock accuracy (step 304). Node 104 recovers a clock signal and the corresponding sync status information from each of one or more received Ethernet signals (step 306) and uses that sync status information to determine which recovered clock signals are suitable for selection as reference clock signal 146 (step 308).

Table II shows one possible set of sync status values that can be included in the Ethernet signals transmitted from network elements to base station nodes. Table II is based on both ANSI (Stratum-based) and ITU-T (G.81x) clock specifications. It may be sufficient to select clock sources for the network elements based on their holdover accuracies (e.g., accuracy over any 24-hour period) as opposed to their long-term (i.e., free-run) accuracies (e.g., accuracy over a specified number of years). Thus, a Stratum 3 clock having a holdover accuracy of about 12 PPB may be suitable, even though its long-term accuracy is about 4.6 PPM. The user-assignable value (last item in Table II) allows users to set their own unique quality levels. For example, if a user wants to define a special base-station clock that does not currently exist, then the user can assign it to this level. As long as all network elements know what this means, when they receive this code, they will act appropriately.

TABLE II

SYNCHRONIZATION STATUS VALUES

| Value | Designation | Meaning |
|---|---|---|
| 1 | Stratum 1 (G.811) traceable | Long-term accuracy of 0.01 PPB |
| 2 | Synchronized traceability unknown | Network element unable to determine accuracy of its own clock signal |
| 3 | Stratum 2 (G.812 Type II) traceable | Long-term accuracy of 16 PPB, and holdover accuracy of 0.1 PPB |
| 4 | TNC (G.812 Type V) traceable | Transit Node Clock traceable with long-term accuracy of 100 PPB, and holdover accuracy of 1.5 PPB |
| 5 | Stratum 3E (G.812 Type III) traceable | Long-term accuracy of 4.6 PPM, but holdover accuracy of 12 PPB |
| 6 | Stratum 3 (G.812 Type IV) traceable | Long-term accuracy of 4.6 PPM, and holdover accuracy of 0.37 PPM |
| 7 | SONET minimum clock (G.813 Option 2) traceable | Long-term accuracy of 20 PPM, and holdover accuracy of 4.6 PPM |
| 8 | Stratum 4/4E traceable | Long-term accuracy of 32 PPM. |
| 9 | Don't use for synchronization | Recovered clock should not be used under any circumstances |
| TBD | Provisionable by network operator | User can assign values that override any other defined values |

There are different ways in which the sync status information can be conveyed from the network elements to the base station nodes. For example, a sync status packet (SSP) can be defined for Ethernet facilities, where each SSP packet conveys the sync status information about the Ethernet signals transmitted over the corresponding facility. Independent SSP packets can be transmitted from the network element to its corresponding base station node at regular intervals (e.g., once every 5 seconds). If the time since the last such "heartbeat" SSP packet exceeds a specified threshold level, then the receiving base station node might be designed to conclude that the corresponding recovered clock signal is no longer suitable for selection as the node's reference clock signal. If that recovered clock signal is the clock signal currently selected for the node's reference clock signal, then the node could either switch to another suitable recovered clock signal or enter a holdover mode.

Holdover mode is the stability that a timing engine is able to maintain after the failure of its line or externally timed references. When entering holdover, the timing engine stores information about the accuracy of its last valid input and uses this information to generate future output clocks. Since various dynamic conditions can affect the accuracy of a clock in holdover (e.g., temperature, vibration, aging, and voltage variation), the static condition of holdover will have a finite duration of accuracy. Since holdover accuracies are typically specified in terms of 24 continuous hours, they are intended as a temporary measure of operation.

By using SSP packets, node 104 can deterministically identify which inputs are good or bad by simply reading the packet. This inherently will improve the detection time of an unsuitable reference vs. the frequency offset method (previously described). In addition, the use of SSP packets allows reliable detection of a failed or unsuitable reference without the need for another comparison reference. Therefore, the use of SSP packets to signal the synchronization state of an Ethernet link can be proven to be efficient and effective.

In addition to the quality-level information conveyed by SSP packets, they can also identify the source of the synchronization reference. Such source information can be conveyed by including the master's medium access control (MAC) address (i.e., the master's source address). Since MAC addresses are unique, no two nodes will have the same MAC address. By identifying the MAC address, each line-timed node will be able to identify the source of the timing signal and use this as part of the priority/quality level algorithm. In addition, by knowing the source of a timing signal, timing loops will be avoided. Timing loops are typically created when the source of a timing signal is unknown. The use of SSP packets with source addressing will enhance the reliability of line-timing from Ethernet facilities.

Alternatively or in addition, sync status information can be embedded in available fields (e.g., reserved header bits) in other Ethernet packets.

In addition to identifying the accuracy of the clock signal used to generate corresponding Ethernet signals, sync status messaging might also explicitly identify the MAC address of the network element that transmitted those Ethernet signals. Base station nodes can be designed to compare the MAC address represented in the sync status messaging with the MAC address of the Ethernet header to confirm that they are identical before determining that the corresponding recovered clock signal is suitable for selection. If any other Ethernet node generates an SSP packet, then the packet will not have timing traceability, so this check ensures that the SSP packet originates from the appropriate master. In addition, the nodes could also perform checks to accept SSP packets only from a list of approved master addresses. This way, a node can also select an input reference based on a unique physical clock (denoted by the master's address).

In one possible implementation of sync status messaging, a base station node is designed to select the most-accurate recovered clock signal. If two or more clock signals have the same best accuracy level, then the base station node may refer to a specified priority list to select one of the clock signals for the node's reference clock signal.

Figure 4:
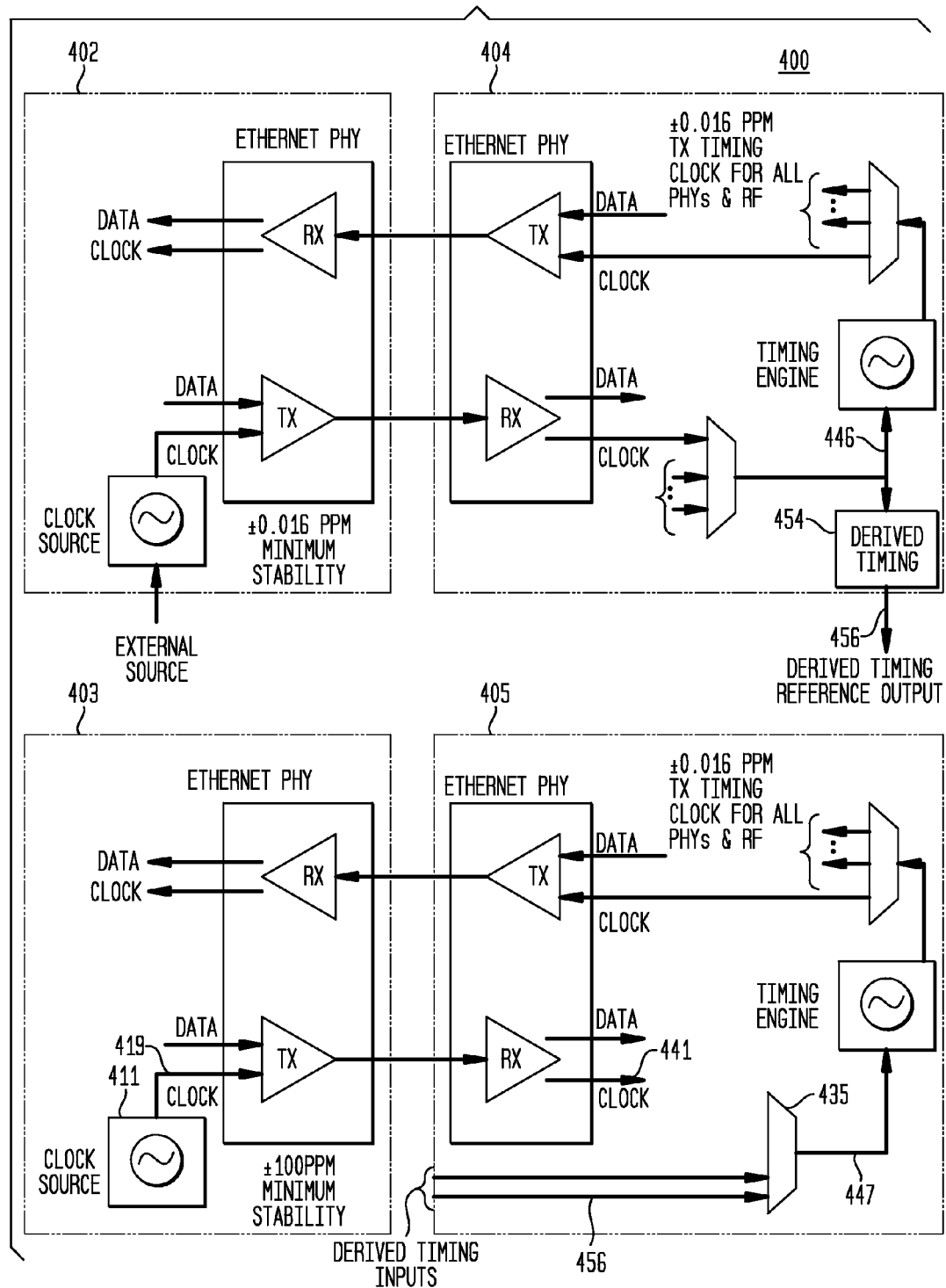
FIG. 4 is a block diagram of a portion of another exemplary wireless telephone system of the present invention.

FIG. 4 is a block diagram of a portion of another exemplary wireless telephone system 400 of the present invention. In particular, FIG. 4 shows two network elements 402 and 403 (located either in one central office or in two different central offices of system 400) and, respectively, their corresponding nodes 404 and 405 (located at one base station of system 400) interconnected by packet-based Ethernet facilities. Each of network elements 402 and 403 is substantially identical to network element 102 of FIG. 1, with the exception that clock source 411 in network element 403 is not capable of generating a clock signal having a high accuracy (e.g., 50 PPB or better). In addition, each of base station nodes 404 and 405 is substantially identical to base station node 104 of FIG. 1, with the exception of the addition of derived-timing interface 454 in node 404 and the implementation of clock selector 435 in node 405 instead of a clock selector identical to clock selector 134. In this embodiment, network element 402 functions as a master timing node for slave nodes 404 and 405, while network element 403 is a free-running node.

In operation, derived-timing interface 454 in node 404 provides reference clock signal 446 (e.g., recovered from highly accurate Ethernet signals transmitted from network element 402 to node 404) as derived clock signal 456 to clock selector 435 in node 405. Clock selector 435 may receive one or more other clock signals, e.g., other derived clock signals from other nodes within the same base station and/or recovered clock signals from Ethernet PHY interfaces within node 405, such as clock signal 441 recovered from the Ethernet signals received by node 405 from network element 403.

By selecting highly accurate derived clock signal 456 as reference clock signal 447 within node 405, network element 403 does not have to be able to generate its own clock signal 419 with significant accuracy. As shown in FIG. 4, clock source 411 is capable of generating a clock signal having an accuracy of only about 100 PPM. This alternative architecture can be used to further reduce the costs of implementing wireless telephone systems based on the present invention.

While the present invention has been described in the context of a base station node that recovers at least three clock signals from at least three different received Ethernet signals, in theory, the invention can be implemented in the context of a base station that recovers as few as a single clock signal from a single received Ethernet signal.

Although the present invention has been described in the context of a wireless telephone system having packet-based Ethernet facilities between its base stations and its central offices, the present invention can also be implemented in other contexts. For example, the wireless telephone system can be a hybrid system in which one or more packet-based Ethernet facilities connect at least one base station to at least one central office, while one or more other base stations of the system are connected to one or more central offices using conventional synchronous (e.g., DS1/E1) connections. The present invention can also be implemented in the context of any other Ethernet network, not just those for base stations and central offices of wireless telephone systems. In general, the present invention can be implemented in the context of communications systems other than wireless telephone systems and/or packet-based connections other than Ethernet facilities.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing steps in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

I claim:

1. A node (e.g., 104, 404) for a packet-based network, the node comprising:
   one or more receivers (e.g., 130), each receiver configured to receive an incoming packet-based signal (e.g., 106) from an other node (e.g., 102) of the network and apply line timing to recover a line-timed clock signal (e.g., 140) from the incoming packet-based signal, wherein the incoming packet-based signal is received over an incoming facility (e.g., 106) having timed transitions even when no packet data is being transmitted over the incoming facility;
   a clock selector (e.g., 134) configured to select one of the one or more recovered line-timed clock signals as a selected reference clock signal (e.g., 146);
   a timing engine (e.g., 136) configured to filter out phase noise from the selected reference clock signal to generate a node clock signal (e.g., 148); and
   one or more transmitters (e.g., 132), each transmitter configured to generate and transmit an outgoing packet-based signal (e.g., 108) to an other node of the network based on the node clock signal.

2. The invention node for a packet-based network of claim 1, wherein, if the clock selector determines that two or more recovered line-timed clock signals have a best accuracy level, then the clock selector selects one of the two or more best-accuracy recovered line-timed clock signals based on a specified priority list.

3. The invention node for a packet-based network of claim 1, wherein:
   the node is configured to receive a heart-beat synchronization status packet (SSP) that identifies (i) an accuracy level of the clock signal used to generate the heart-beat SSP and (ii) an address of a source node that generated the heart-beat SSP packet;
   if the clock selector determines that it has not received a heart-beat SSP from the source node for more than a specified duration threshold, then the node determines that the recovered line-timed clock signal corresponding to the source node is not suitable to be the selected reference clock signal.

4. The invention node for a packet-based network of claim 1, wherein the node is configured to transmit to an other node of the network a heart-beat SSP that identifies (i) an accuracy level of the clock signal used to generate the heart-beat SSP and (ii) an address of the node.

5. The invention node for a packet-based network of claim 1, further comprising a derived-timing interface (e.g., 454) configured to transmit the selected reference clock signal (e.g., 446) to an other node of the network as a derived clock signal (e.g., 456), wherein the other node is configured to select the derived clock signal as its selected reference clock signal (e.g., 447).

6. The invention node for a packet-based network of claim 1, wherein the clock selector (e.g., 435) is further configured to receive one or more derived clock signals (e.g., 456) from one or more other nodes of the network and select one of the one or more derived clock signals as the selected reference clock signal (e.g., 447).

7. The invention node for a packet-based network of claim 1, wherein the timing engine is configured to enter a holdover mode if the clock selector determines that no recovered line-timed clock signal is suitable for the selected reference clock signal.

8. The invention node for a packet-based network of claim 1, wherein:
   the node is configured to be part of a base station of a wireless telephone system; and
   the base station is configured to use the node clock signal to generate and transmit wireless transmissions to one or more wireless units of the wireless telephone system.

9. The invention node for a packet-based network of claim 1, wherein the incoming and outgoing packet-based signals are Ethernet signals.

10. The invention node for a packet-based network of claim 1, wherein the node comprises a plurality of said transmitters, wherein each transmitter in the plurality is configured to generate and transmit an outgoing packet-based signal to an other node of the network based on the same node clock signal.

11. The invention node for a packet-based network of claim 1, wherein, in a non-holdover, non-free-run mode, each transmitter is configured to generate and transmit an outgoing packet-based signal to an other node of the network independent of any clock source local to the node and independent of any GPS receiver local to the node.

12. The invention node for a packet-based network of claim 1, wherein:
   if the clock selector determines that two or more recovered line-timed clock signals have a best accuracy level, then the clock selector selects one of the two or more best-accuracy recovered line-timed clock signals based on a specified priority list;
   the node is configured to receive an incoming heart-beat SSP that identifies (i) an accuracy level of the clock signal used to generate the incoming heart-beat SSP and (ii) an address of a source node that generated the incoming heart-beat SSP packet;
   if the clock selector determines that it has not received an incoming heart-beat SSP from the source node for more than a specified duration threshold, then the node determines that the recovered line-timed clock signal corresponding to the source node is not suitable to be the selected reference clock signal;
   the node is configured to transmit to an other node of the network an outgoing heart-beat SSP that identifies (i) an accuracy level of the clock signal used to generate the outgoing heart-beat SSP and (ii) an address of the node;
   the timing engine is configured to enter a holdover mode if the clock selector determines that no recovered line-timed clock signal is suitable for the selected reference clock signal;
   the incoming and outgoing packet-based signals are Ethernet signals;
   the node comprises a plurality of said transmitters, wherein each transmitter in the plurality is configured to generate and transmit an outgoing packet-based signal to an other node of the network based on the same node clock signal; and in a non-holdover, non-free-run mode, each transmitter is configured to generate and transmit an outgoing packet-based signal to an other node of the network independent of any clock source local to the node and independent of any GPS receiver local to the node.

13. A node (e.g., 102) for a packet-based network, the node comprising:

a clock source (e.g., 110) having an accuracy of 16 parts per billion (PPB) or better configured to generate a reference clock signal (e.g., 118) for the node; and one or more transmitters (e.g., 114), each transmitter configured to generate and transmit an outgoing packet-based signal (e.g., 106) to an other node (e.g., 104) of the network based on the reference clock signal, wherein:

the outgoing packet-based signal is transmitted over an outgoing facility (e.g., 106) having timed transitions even when no packet data is being transmitted over the outgoing facility; and the outgoing packet-based signal comprises a sequence of heart-beat synchronization status packets (SSPs) identifying (i) an accuracy level of the reference clock signal and (ii) a source address of the node, wherein each transmitter is configured to transmit heart-beat SSPs at a specified rate.

14. The invention node for a packet-based network of claim 13, wherein each transmitter is configured to transmit one heart-beat SSP every 5 seconds.

15. The invention node for a packet-based network of claim 13, wherein:

the node is configured to be part of a central office of a wireless telephone system; and at least one other node is a base station of the wireless telephone system.

16. The invention node for a packet-based network of claim 13, wherein:

the node is configured to be part of a central office Ethernet packet transport system; and at least one outgoing packet-based signal is an Ethernet signal transmitted to an Ethernet network element.

17. A node (e.g., 405) for a packet-based network, the node comprising:

at least one receiver configured to receive an incoming packet-based signal from a first node (e.g., 403) of the network;

a clock selector (e.g., 435) configured to (i) receive one or more derived clock signals (e.g., 456) from one or more other nodes (e.g., 404) of the network different from the first node and (ii) select one of the one or more derived clock signals as a selected reference clock signal (e.g., 447);

a timing engine configured to filter out phase noise from the selected reference clock signal to generate a node clock signal; and one or more transmitters, each transmitter configured to generate and transmit an outgoing packet-based signal to an other node of the network based on the node clock signal.

18. The invention node for a packet-based network of claim 17, wherein the clock selector (e.g., 435) is further configured to (i) receive a recovered clock signal (e.g., 441) recovered from the incoming packet-based signal from the first node of the network and (ii) select the recovered clock signal as the selected reference clock signal.

19. The invention node for a packet-based network of claim 17, wherein the timing engine is configured to enter a holdover mode if the clock selector determines that no derived clock signal is suitable for the selected reference clock signal.

20. The invention node for a packet-based network of claim 17, wherein:

the node is configured to be part of a base station of a wireless telephone system; and the base station is configured to use the node clock signal to generate and transmit wireless transmissions to one or more wireless units of the wireless telephone system.

21. The invention node for a packet-based network of claim 17, wherein the incoming and outgoing packet-based signals are Ethernet signals.

22. The invention node for a packet-based network of claim 17, wherein the node comprises a plurality of said transmitters, wherein each transmitter in the plurality is configured to generate and transmit an outgoing packet-based signal to an other node of the network based on the same node clock signal.

23. The invention node for a packet-based network of claim 17, wherein, in a non-holdover, non-free-run mode, each transmitter is configured to generate and transmit an outgoing packet-based signal to an other node of the network independent of any clock source local to the node and independent of any GPS receiver local to the node.

24. The invention node for a packet-based network of claim 17, wherein:

the timing engine is configured to enter a holdover mode if the clock selector determines that no derived clock signal is suitable for the selected reference clock signal;

the incoming and outgoing packet-based signals are Ethernet signals;

the node comprises a plurality of said transmitters, wherein each transmitter in the plurality is configured to generate and transmit an outgoing packet-based signal to an other node of the network based on the same node clock signal; and in a non-holdover, non-free-run mode, each transmitter is configured to generate and transmit an outgoing packet-based signal to an other node of the network independent of any clock source local to the node and independent of any GPS receiver local to the node.

25. A regeneration node for a packet-based network, the regeneration node comprising:

a receiver configured to receive an incoming packet-based signal from an other node of the network and apply line timing to recover a line-timed clock signal from the incoming packet-based signal, wherein the incoming packet-based signal is received over an incoming facility having an input timing domain with timed transitions even when no packet data is being transmitted over the incoming facility;

a timing engine configured to filter out phase noise from the recovered line-timed clock signal to generate a node clock signal; and a transmitter configured to generate and transmit an outgoing packet-based signal to an other node of the network based on the node clock signal, wherein the outgoing packet-based signal preserves the input timing domain of the incoming facility.

26. The invention regeneration node for a packet-based network of claim 25, wherein the incoming and outgoing packet-based signals are Ethernet signals.

* * * * *